(12) United States Patent
Zhang et al.

(10) Patent No.: US 8,560,717 B2
(45) Date of Patent: Oct. 15, 2013

(54) METHOD AND SYSTEM FOR IMPLEMENTING VIDEO CALL SERVICE AND VIDEO INTERWORKING GATEWAY DEVICE

(75) Inventors: Hong Zhang, Shenzhen (CN); Gaofeng Yang, Shenzhen (CN); Lin Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1101 days.

(21) Appl. No.: 12/538,591

(22) Filed: Aug. 10, 2009

(65) Prior Publication Data

US 2009/0303310 A1 Dec. 10, 2009

Related U.S. Application Data

(63) Continuation of application No. PCT/CN2008/071635, filed on Jul. 14, 2008.

(30) Foreign Application Priority Data

Aug. 20, 2007 (CN) .......................... 2007 1 0138774

(51) Int. Cl.
*G06F 15/16* (2006.01)
*H04M 11/00* (2006.01)
*H04M 7/00* (2006.01)

(52) U.S. Cl.
USPC ...................... 709/231; 455/403; 379/221.01

(58) Field of Classification Search
USPC ......... 455/414.1, 418; 348/14.01–14.02, 552; 370/401, 395.5; 379/201.12, 379/207.12–207.16, 211.03–211.04
See application file for complete search history.

(56) References Cited

U.S. PATENT DOCUMENTS

2006/0077990 A1* 4/2006 Lee et al. ...................... 370/401

FOREIGN PATENT DOCUMENTS

| CN | 1812559 | | 8/2006 |
|---|---|---|---|
| CN | 1856131 | A | 11/2006 |
| CN | 1988544 | | 6/2007 |
| CN | 1996970 | | 7/2007 |
| CN | 101374330 | B | 6/2011 |

(Continued)

OTHER PUBLICATIONS

Written Opinion of the International Searching Authority issued in corresponding PCT Patent Application No. PCT/CN2008/071635, mailed Oct. 23, 2008.

(Continued)

*Primary Examiner* — Mohammad Islam
(74) *Attorney, Agent, or Firm* — Brinks Hofer Gilson & Lione

(57) ABSTRACT

A video interworking gateway device, a system and method for implementing a video phone call service are provided, which processes the service when a call object changes if the call is not disconnected. The system includes a video interworking gateway device, a broadband resource device and a bearer connection device. The video interworking gateway device negotiates with a calling H.324 entity about parameters, and connects the calling H.324 entity to the broadband resource device on obtaining negotiation parameters of the calling H.324 entity; the video interworking gateway device negotiates with a called H.324 entity about parameters, obtains negotiation parameters of the called H.324 entity, exchanges the negotiation parameters of the calling H.324 entity and those of the called H.324 entity between the calling H.324 entity and the called H.324 entity, and disconnects the connection between the calling H.324 entity and the broadband resource device.

14 Claims, 6 Drawing Sheets

(56) References Cited

FOREIGN PATENT DOCUMENTS

| WO | WO 03/103243 A1 | 12/2003 |
| WO | WO 2007/016270 A2 | 2/2007 |
| WO | WO 2007016270 A2 * | 2/2007 |
| WO | WO 2007/046645 A1 | 4/2007 |
| WO | WO 2008/078000 A1 | 7/2008 |

OTHER PUBLICATIONS

Extended European Search Report issued in corresponding European Patent Application No. 08783695.3, mailed Oct. 26, 2010.

International Telecommunication Union, "Series H: Audiovisual and Multimedia Systems: Infrastructure of audiovisual services—Systems and terminal equipment for audiovisual services, Terminal for low bit-rate multimedia communication" Telecommunication Standardization Sector of ITU. H.324, Mar. 2002.

Office Action issued in corresponding Korean Patent Application No. 10-2009-7017985, mailed Mar. 3, 2011.

Office Action issued in corresponding European Patent Application No. 08783695.3, mailed Dec. 21, 2011.

* cited by examiner

METHOD AND SYSTEM FOR IMPLEMENTING VIDEO CALL SERVICE AND VIDEO INTERWORKING GATEWAY DEVICE

CROSS REFERENCE TO RELATED APPLICATIONS

The present application is a continuation application of International Patent Application No. PCT/CN2008/071635, filed on Jul. 14, 2008, which claims priority to Chinese patent application No. 200710138774.0, filed on Aug. 20, 2007, both of which are hereby incorporated by reference in their entireties.

FIELD OF THE INVENTION

The present invention relates to communication system, in particular to the technology of implementing video call services.

BACKGROUND OF THE INVENTION

The Third Generation (3G) communication system consists of a Core Network (CN), a Radio Access Network (RAN) and User Equipment (UE). The main function of the CN is traffic forwarding and addressing between the UEs, and the CNs are divided into a Circuit Switch (CS) domain and a Packet Switch (PS) domain. The CS domain features stable transmission characteristics, low time delay and bandwidth assurance owing to being based on circuit switch. The CS domain can provide 64K bandwidth resource to each UE.

The 3G network can provide mobile Video Phone (VP) call service. The mobile VP call service is a new mobile service which may deliver video contents to users via the 3G network and 3G equipment, so that users may not only hear from each other but also watch the video image of the counterpart in a real time manner. In the 3G network in R99 and R4 releases, like the traditional voice service, the mobile VP call service adopts narrow-band circuit bearer. The narrow-band circuit bearer indicates that traffic is transmitted on a narrow-band circuit. In order to implement multimedia communication on the narrow-band circuit, i.e. to implement real time video and voice transmission, the ITU-T defines H.324 series of low-speed multimedia interworking protocol family dedicated to the mobile VP call service. The protocol family includes H.245 protocol (Control Protocol for Multimedia Communication), H.223 protocol, etc. The H.245 protocol specifies signaling adopted for implementing multimedia communication. The H.223 protocol specifies a multiplexing method for implementing multimedia communication. Audio data and video data, etc., in the multimedia communication is combined into H.223 multiplexing stream with a specific multiplexing method. According to the H.324 protocol, the 3G equipment may be deemed as an H.324 entity, which adopts narrow-band circuit bearer, i.e., the mobile VP call service is developed in the CS domain of the 3G network. The H.324 entity multiplexes audio stream, video stream and control stream, which are in compliance with the H.245 protocol and are involved in the mobile VP call service, onto a narrow-band circuit with a 64 kbit/s bandwidth via the H.223 protocol. The mobile VP call service is abbreviated as VP call service hereinafter.

In the 3G network, a flow of the VP call service may include following two phases.

The first phase: The narrow-band circuit for bearer is activated via narrow-band Integrated Services Digital Network User Part (ISUP) signaling.

The second phase: Parameters are negotiated between two parties, H.324 entities, by means of the activated narrow-band circuit. Content to be negotiated includes: H.245 protocol-compliant audio and video codec modes used in a call, H.223 protocol-compliant multiplexing parameters used for audio and video coding and decoding, and multiplexed audio and video logical channels, etc. The purpose of negotiation is to determine communication parameters required in the call of the two parties, H.324 entities. On a successful negotiation, the two parties, H.324 entities send audio and video stream to each other according to negotiated parameters, to implement the VP call service.

In the traditional 2G network, on the premise that a call is not disconnected, the switch of a call object of a user is implemented by a circuit switch device changing a narrow-band circuit for bearer. For example, in the customized ring back tone service in the traditional 2G network, a calling user A1 originates a call to a called user C1. The call arrives at a Mobile Switching Center (MSC), in which it is queried that the called user C1 has registered the customized ring back tone service, and the MSC routes the call to a customized ring back tone center. The customized ring back tone center originates a call to the called user C1. After the called user C1 rings, the customized ring back tone center plays audio customized ring back tone subscribed to by the called user C1 to the calling user A1. In this case, the call object of A1 is a device B1 responsible for playing the audio customized ring back tone in the customized ring back tone center. After the called user C1 performs an off-hook, a circuit switch device in the customized ring back tone center changes the narrow-band circuit connection directly on the premise that the call is not disconnected, so that the call object of the calling user A1 is changed from the device B1 to the called user C1, thereby the calling user A1 is connected with the called user C1.

The above processing methods may cause problems in the H.324-compliant VP call service. For example, in the CS domain of the 3G network, H.324 entities, such as A2 and B2, implement the VP call service after the parameter negotiation. If it is needed that the call object B2 of A2 is changed to be another H.324 entity, C2, on the premise that the call is not disconnected, the changing of the involved narrow-band circuit is the same as that in the 2G network for the first phase of the VP call service, i.e. the circuit switch device changes the narrow-band circuit connection directly. However, a problem may arise to the parameter negotiation between H.324 entities involved in the second phase. For the A2 in a normal call state after a negotiation, if the call object B2 in a normal state is changed to C2 in an initial state, the A2 does not know the changing of the call object and deems that the B2 goes abnormal, which affects the normal implementation of the VP call service between the A2 and the C2, thereby causing the call to be disconnected.

In the prior art, a Video Interworking Gateway (VIG) is utilized to implement the VP call service between an H.324 entity and a broadband resource device. The VIG is a physical entity capable of providing video interworking gateway resources. The video interworking gateway resource is a logic entity embodying the function of the Video Interworking Gateway. One VIG may provide multiple video interworking gateway resources. It is certain that the VP call service through the VIG involves one end of the H.324 entity, which generally utilizes a narrow-band circuit bearer based on the time division multiplexing (TDM) technology, and the other end of a broadband resource device, which generally utilizes a broadband IP bearer based on the Real-time Transfer Protocol (RTP). The broadband IP bearer means traffic is transmitted via a broadband IP network. If the VIG is utilized to implement the VP call service between the H.324 entity and the broadband resource device, the process is as follows: Parameters are negotiated between the VIG and the H.324 entity, the H.324 entity is connected to the broadband resource device on a successful negotiation, the VIG utilizes a video interworking gateway resource to perform burdensome media stream coding and decoding between two heterogeneous networks during the implementation of the VP call service between the H.324 entity and the broadband resource device. However, as shown in FIG. 1, the VP call service supported by the VIG involves one end of the H.324 entity in the CS domain of the 3G network and the other end of the broadband resource device, and the VIG does not need to provide any service for the VP call service between two H.324 entities.

SUMMARY OF THE INVENTION

An embodiment of the present invention provides a video interworking gateway device and a system and method for implementing a VP call service, which may change a call object of a calling H.324 entity from a broadband resource device to a called H.324 entity on the premise that the call is not disconnected, for the case that the call object of the H.324 entity changes.

An embodiment of the present invention provides a video interworking gateway device, including:

a broadband resource connection unit, adapted to connect a calling H.324 entity and the broadband resource device, and the calling H.324 entity requires the broadband resource device to perform a video play in a video phone call service;

a parameter negotiation unit, adapted to negotiate with the calling H.324 entity about parameters, to obtain negotiation parameters of the calling H.324 entity, inform the broadband resource connection unit to connect the calling H.324 entity to the broadband resource device on a successful negotiation, to negotiate with a called H.324 entity in the video phone call service about parameters to obtain negotiation parameters of the called H.324 entity;

a parameter storage unit, adapted to store the negotiation parameters of the calling H.324 entity and the negotiation parameters of the called H.324 entity, and the negotiation parameters of the calling H.324 entity and those of the called H.324 entity are obtained by the parameter negotiation unit; and a parameter exchange unit, adapted to exchange the negotiation parameters of the calling H.324 entity and the negotiation parameters of the called H.324 entity, between the calling H.324 entity and the called H.324 entity, and the negotiation parameters of the calling H.324 entity and those of the called H.324 entity are stored in the parameter storage unit.

An embodiment of the present invention provides a system for implementing a video phone call service, including a video interworking gateway device, a broadband resource device and a bearer connection device; in which the video interworking gateway device is adapted to negotiate with a calling H.324 entity about parameters to obtain negotiation parameters of the calling H.324 entity, and to connect the calling H.324 entity to the broadband resource device on a successful negotiation, and the calling entity requires the broadband resource device to perform a video play in a video phone call service;

the video interworking gateway device is further adapted to negotiate with a called H.324 entity in the video phone call service about parameters, to obtain negotiation parameters of the called H.324 entity, exchange the negotiation parameters of the calling H.324 entity and the negotiation parameters of the called H.324 entity between the calling H.324 entity and the called H.324 entity, and disconnect the connection between the calling H.324 entity and the broadband resource device;

the broadband resource device is adapted to perform the video play; and the bearer connection device is adapted to connect a bearer between the calling H.324 entity and the called H.324 entity when the video interworking gateway device disconnects the connection between the calling H.324 entity and the broadband resource device.

An embodiment of the present invention also provides a method for implementing a video phone call service, including:

negotiating with a calling H.324 entity about parameters to obtain negotiation parameters of the calling H.324 entity, and connecting the calling H.324 entity to a broadband resource device on a successful negotiation, and the calling entity requires the broadband resource device to perform a video play in the video phone call service;

negotiating with a called H.324 entity in the video phone call service about parameters when the called user answers, and obtaining negotiation parameters of the called H.324 entity; and exchanging the negotiation parameters of the calling H.324 entity and the negotiation parameters of the called H.324 entity between the calling H.324 entity and the called H.324 entity, disconnecting the connection between the calling H.324 entity and the broadband resource device, and connecting a bearer between the calling H.324 entity and the called H.324 entity.

The video interworking gateway device, the system and method for implementing a VP call service are provided according to the embodiments of the present invention. The video interworking gateway device negotiates with the calling H.324 entity about parameters and connects the calling H.324 entity to a broadband resource device on a successful negotiation, which implements a video play to the calling H.324 entity. On the premise that the call is not disconnected, the call object of the calling H.324 entity is switched to the called H.324 entity. The VP call service is implemented between the calling H.324 entity and the called H.324 entity. This is adaptable when the call object of the calling H.324 entity, which requires the broadband resource device to perform a video play in the video phone call service, changes, and ensures that various video phone call services may be implemented successfully.

After the calling H.324 entity and the called H.324 entity exchanges the negotiation parameters, the video phone call service is implemented directly between the calling H.324 entity and the called H.324 entity by connecting a bear between the calling H.324 entity and the called H.324 entity. Therefore, video interworking gateway resources and bandwidth resources are released, which reduces the dependency on the expensive video interworking gateway resources.

DETAILED DESCRIPTION OF THE EMBODIMENTS

Figure 1:
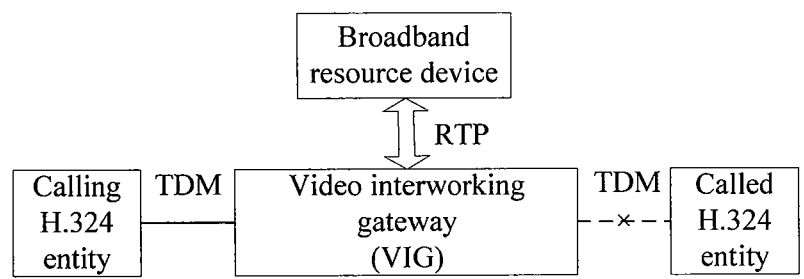
FIG. 1 is a schematic diagram of video interworking involving a VIG in the prior art.

From the analysis of new services that may be implemented in the 3G network in future, various VP call services including a video play and a possible collecting digit in video mode, extended on the basis of VP call services, will be in a large proportion, such as a video customized ring back tone service and an online monitor service. The video play refers to playing video and voice to a user. The collecting digit in video mode refers to that a user presses a number key to feed back his choice according to video and voice prompts. These VP call services have the same scenario modes: a calling H.324 entity originates a VP call service to a 3G network; the 3G network connects the calling H.324 entity to a broadband resource device responsible for the video play and collecting digit in video mode; the broadband resource device plays video and voice to the calling H.324 entity and possibly the collecting digit in video mode is involved; the calling H.324 entity and a called H.324 entity having video capability need to implement the VP call service on the premise that the call is not disconnected. In the whole process of implementation of the VP call service, firstly the calling H.324 entity and the broadband resource device implement the VP call service, then on the premise that a call is not disconnected, the call object of the calling H.324 entity is switched from the broadband resource device to the called H.324 entity, and the VP call service is implemented between the calling H.324 entity and the called H.324 entity. The call object is switched in the whole VP call service. If a second negotiation is not performed between the calling H.324 entity and the called H.324 entity before the switching of the call object, the call will be disconnected definitely. Therefore, it is necessary to establish a second negotiation mechanism between the calling H.324 entity and the called H.324 entity so as to ensure the whole successful implementation of the VP call service.

The second negotiation is necessary because the switching of the call object occurs in the whole process of the VP call service. The switching is performed by a bearer connection device. In the CS domain of the 3G network, multimedia data of the VP call service is transmitted via a narrow-band circuit, i.e., the multimedia data is born via the narrow-band circuit. In this case, the bearer connection device is a circuit switch device responsible for narrow-band circuit connection. With the development of technology, if multimedia data of a VP call service between a calling H.324 entity and a called H.324 entity is transmitted via a broadband IP network, i.e. a broadband IP bearer is adopted, the bearer connection device is a network entity for the broadband IP connection between the calling H.324 entity and the called H.324 entity.

An embodiment of the present invention provides a solution for implementing a VP call service. In this solution, a video interworking gateway device having a video interworking gateway function is integrated in a bearer connection device. The solution for implementing the VP call service is described briefly as follows.

When a calling H.324 entity makes a call, the video interworking gateway device negotiates with the calling H.324 entity about parameters. On a successful negotiation, the video interworking gateway device connects the calling H.324 entity to a broadband resource device, which plays to the calling H.324 entity video plus voice and a possible collecting digit in video mode. During the connection, the video interworking gateway device utilizes a video interworking gateway resource to perform burdensome media stream coding and decoding. This is the process of implementation of the VP call service between the calling H.324 entity and the broadband resource device.

If it is needed to disconnect the video play of the broadband resource device to the calling H.324 entity, when the calling H.324 entity is connected to the called H.324 entity, firstly the video interworking gateway device calls the called H.324 entity to perform parameter negotiation with the called H.324 entity; then the video interworking gateway device exchanges negotiation parameters between the calling H.324 entity and the called H.324 entity, and further the video interworking gateway device may compare the negotiation parameters of the calling H.324 entity with those of the called H.324 entity; if it is determined that the negotiation parameters of the calling H.324 entity are different from those of the called H.324 entity, the video interworking gateway device exchanges the negotiation parameters of the calling H.324 entity and those of the called H.324 entity; after the accomplishment of exchanging of the negotiation parameters, the calling H.324 entity and the called H.324 entity may know the negotiation parameters of each other, the connection between the calling H.324 entity and the broadband resource device is disconnected, and the bearer connection device performs the connection between the calling H.324 entity and the called H.324 entity. The VP call service between the calling H.324 entity and the called H.324 entity is implemented directly via the connected bearer. The bearer here includes a narrow-band circuit bearer and a broadband IP bearer.

Figure 2:
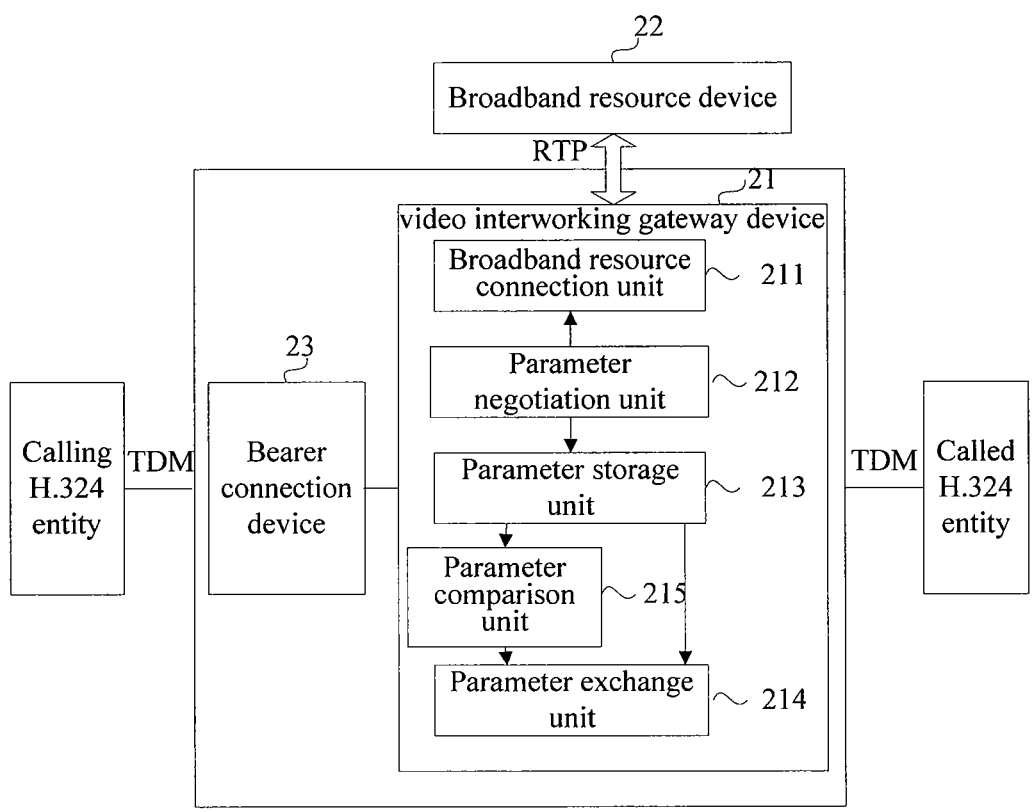
FIG. 2 is a block diagram of a system for implementing a VP call service according to an embodiment of the present invention.

As shown in FIG. 2, an embodiment of the present invention provides a video interworking gateway device 21, including:

a broadband resource connection unit 211, adapted to connect a calling H.324 entity, and the broadband resource device, the calling H.324 entity requires a broadband resource device to perform video play in a VP call service;

a parameter negotiation unit 212, adapted to negotiate with the calling H.324 entity about parameters to obtain negotiation parameters of the calling H.324 entity, to inform the broadband resource connection unit 211 to connect the calling H.324 entity to the broadband resource device on a successful negotiation; and to negotiate with a called H.324 entity in the VP call service about parameters to obtain negotiation parameters of the called H.324 entity;

a parameter storage unit 213, adapted to store the negotiation parameters of the calling H.324 entity and those of the called H.324 entity, and the negotiation parameters of the calling H.324 entity and those of the called H.324 entity are obtained by the parameter negotiation unit 212; and a parameter exchange unit 214, adapted to exchange the negotiation parameters of the calling H.324 entity and those of the called H.324 entity, between the calling H.324 entity and the called H.324 entity, and the negotiation parameters of the calling H.324 entity and those of the called H.324 entity are stored in the parameter storage unit 213.

If the negotiation parameters of the calling H.324 entity are the same as those of the called H.324 entity, the parameter exchange operation by the parameter exchange unit 214 is unnecessary. The video interworking gateway device 21 may further include:

a parameter comparison unit 215, adapted to compare the negotiation parameters of the calling H.324 entity with those of the called H.324 entity, which are stored in the parameter storage unit 213, and to trigger the parameter exchange unit 214 to exchange negotiation parameters if it is determined that the negotiation parameters of the calling H.324 entity are not the same as those of the called H.324 entity.

Based on the video interworking gateway device according to the embodiment of the present invention, a system for implementing a VP call service is also provided. The system may include a video interworking gateway device 21, a broadband resource device 22 and a bearer connection device 23.

The video interworking gateway device 21 is adapted to negotiate with a calling H.324 entity which requires the broadband resource device 22 to perform video play in the VP call service about parameters to obtain negotiation parameters of the calling H.324 entity, and to connect the calling H.324 entity to the broadband resource device 22 on a successful negotiation.

The video interworking gateway device 21 is further adapted to negotiate with a called H.324 entity in the VP call service about parameters to obtain negotiation parameters of the called H.324 entity, to exchange the negotiation parameters of the calling H.324 entity and those of the called H.324 entity between the calling H.324 entity and the called H.324 entity, and to disconnect the connection between the calling H.324 entity and the broadband resource device 22.

The broadband resource device 22 is adapted to perform the video play to the calling H.324 entity.

The bearer connection device 23 is adapted to connect the bearer between the calling H.324 entity and the called H.324 entity when the video interworking gateway device 21 disconnects the connection between the calling H.324 entity and the broadband resource device 22.

The bearer connection device 23 may include a circuit switch device.

The called H.324 entity may include a 3G terminal having a video function and a network device supporting H.324 interworking, such as a video interworking gateway (VIG) and a MCU for video conference.

Figure 3:
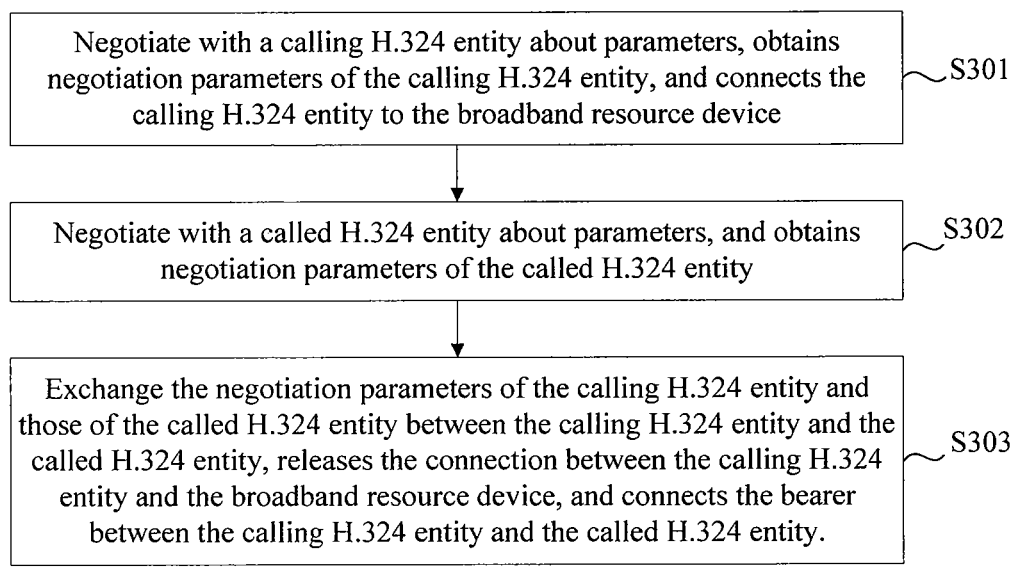
FIG. 3 is a flowchart of a method for implementing a VP call service according to an embodiment of the present invention.

Another embodiment of the present invention provides a method for implementing a VP call service. As shown in FIG. 3, the method may include the following steps:

S301: Negotiating with a calling H.324 entity which requires a broadband resource device to perform video play in the VP call service about parameters to obtain negotiation parameters of the calling H.324 entity, and connecting the calling H.324 entity to the broadband resource device on a normal negotiation;

S302: Negotiating with a called H.324 entity in the VP call service about parameters to obtain negotiation parameters of the called H.324 entity after a called user answers the call; and S303: Exchanging the negotiation parameters of the calling H.324 entity and those of the called H.324 entity between the calling H.324 entity and the called H.324 entity, disconnecting the connection between the calling H.324 entity and the broadband resource device, and connecting the bearer between the calling H.324 entity and the called H.324 entity.

The method may further include the following step:

Determining that the negotiation parameters of the calling H.324 entity are different from those of the called H.324 entity before exchanging the negotiation parameters of the calling H.324 entity and those of the called H.324 entity between the calling H.324 entity and the called H.324 entity.

Embodiments of the present invention provide a system and method for implementing a VP call service, which is applied when the call object of an H.324 entity changes in the process of implementation of the VP call service, so as to ensure the implementation of the VP call service.

Solutions according to the embodiments of the present invention should be implemented by means of functions of a video interworking gateway, but seeks to minimize the dependency on video interworking gateway resources. After the calling H.324 entity and the called H.324 entity complete a second negotiation by a parameter exchange, the VP call service is implemented directly between the calling H.324 entity and the called H.324 entity by connecting the bearer between the calling H.324 entity and the called H.324 entity, and the video interworking gateway resource and broadband resources are released. In the whole process of the service, the occupation of the video interworking gateway resource stands mainly in the phase of connecting the calling H.324 entity to the broadband resource device. This phase of connecting the calling H.324 entity to the broadband resource device requires only one video interworking gateway resource and stands a short period in proportion to the whole duration of the VP call service; therefore, this solution may reduce the dependency of the VP call service on video interworking gateway resources greatly.

The solutions of implementing a VP call service according to two specific embodiments of the present invention are described as follows.

Embodiment 1

Figure 4:
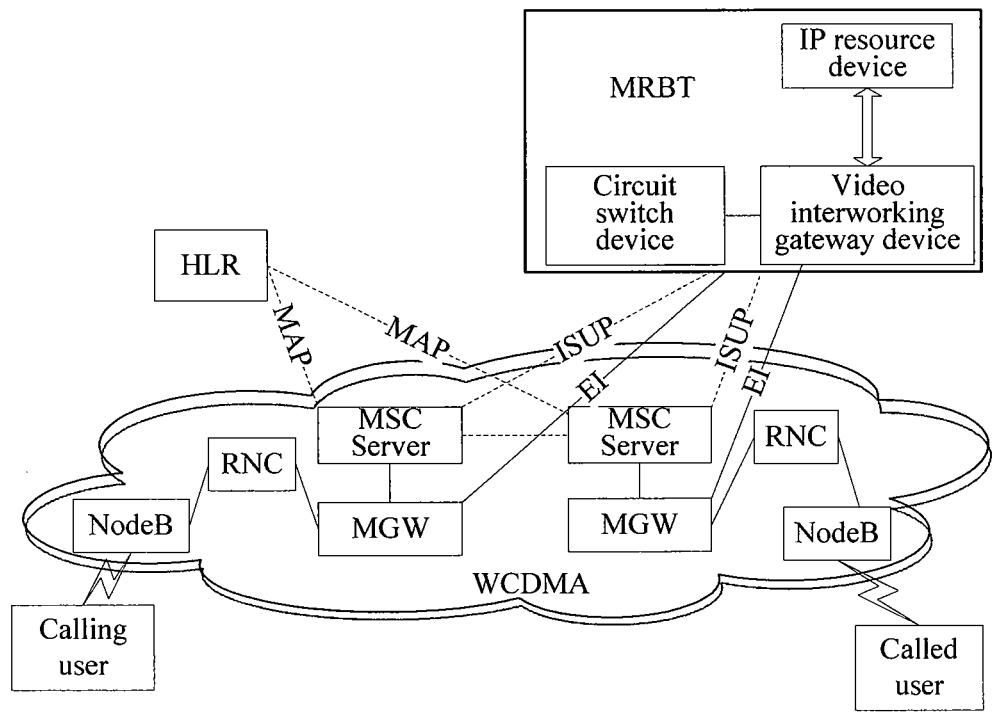
FIG. 4 is a networking schematic diagram of a video customized ring back tone service according to an embodiment of the present invention.

A video customized ring back tone service in a WCDMA network is a specific embodiment of a VP call service requiring a broadband resource device to perform video play in the CS domain of a 3G network. A networking diagram of the video customized ring back tone service in the WCDMA network is illustrated in FIG. 4, which involves network entities including Mobile Switching Center Servers (MSC Servers), Multimedia Gateways (MGWs), a Multimedia Ring Back Tone (MRBT) and a Home Location Register (HLR). The MRBT, as an application platform, is adapted to process the video customized ring back tone service. The MRBT includes a circuit switch device and an IP resource device having broadband resource capability. The circuit switch device is a bear connection device. The IP resource device is a broadband resource device. 3G terminals used by a calling user and a called user are H.324 entities, and the called user has registered the video customized ring back tone service.

A call process of the video customized ring back tone service is as follows: A calling user originates to a called user a VP call, which first arrives at a WCDMA network; an MSC in the network, on receiving the call, searches in the HLR for whether the called user has registered the video customized ring back tone service, and if the called user has registered the video customized ring back tone service, the MSC routes the call to the MRBT; the MRBT originates a VP call to the called user after an analysis; the MRBT plays video customized ring back tone subscribed to by the called user to the calling user after the called user rings; the MRBT connects the calling user and the called user after the called user performs an off-hook. Apparently, such a scenario involves the VP call service which requires the broadband resource device to perform a video play according to the embodiments of the present invention. For playing video customized ring back tone to the calling user, the IP resource device having broadband resource capability in the MRBT first performs the video play to the calling user, i.e., the VP call service is implemented between the calling user and the IP resource device; after the called user performs the off-hook, the call object of the calling user should be switched to the called user, so that the VP call service is implemented between the calling user and the called user.

For implementing the video customized ring back tone service normally, a video interworking gateway device according to an embodiment of the present invention is integrated in the MRBT system. The MRBT negotiates with the calling user about parameters via the video interworking gateway device, and connects the calling user to the IP resource device on a successful negotiation. The IP resource device performs the video customized ring back tone to the calling user. After the called user performs the off-hook, the video interworking gateway device negotiates with the called user about parameters, exchanges negotiation parameters of the calling user and those of the called user, and disconnects the connection between the calling H.324 entity and the broadband resource device. The circuit switch device connects the narrow-band circuit bear between the calling user and the called user.

Figure 5:
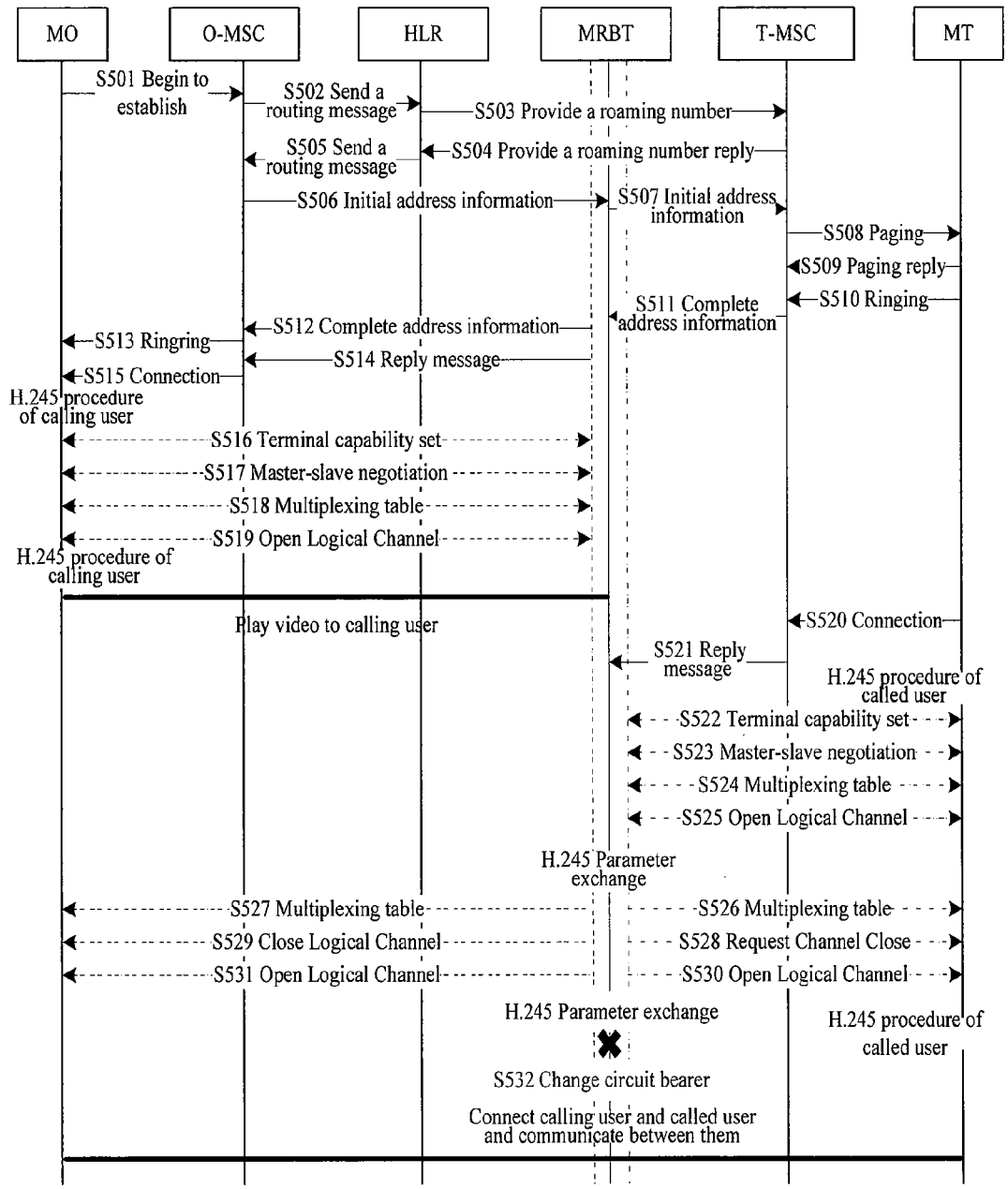
FIG. 5 is a flowchart of a video customized ring back tone service according to an embodiment of the present invention.

A flow for processing the video customized ring back tone service is described in FIG. 5, in which solid lines denote call control-related messages such as Q931 and isup, single point double lines denote H.245 messages for parameter negotiation between the video interworking gateway device and the calling user, and double point single lines denote H.245 messages for parameter negotiation between the video interworking gateway device and the called user. The flow for processing the video customized ring back tone service may include the steps as follows.

S501 to S506: A calling user originates to a called user a VP call, which first arrives at a WCDMA network; a mobile switching center server at the calling user side (O_MSC) sends a routing message to an HLR; the HLR, on receiving the routing message, instructs the mobile switching center server at the called user side (T_MSC) to provide a roaming number of the called user; the HLR searches that the called user has registered the video customized ring back tone service after obtaining the roaming number of the called user, and informs the O_MSC to route the VP call originated from the calling user to the MRBT.

S507 to S509: The video interworking gateway device in the MRBT originates a VP call to the T_MSC according to the roaming number of the called user.

S510 to S513: The MRBT sends transparently a ringing signal from the called to the calling, after the T_MSC receives the ringing signal.

S514 to S515: The MRBT receives a Play command and sends a connection command to the calling user to connect a voice channel and perform a video play to the calling user.

S516 to S519: The video interworking gateway device begins to negotiate with the calling user about parameters, particularly:

An H.245 negotiation is performed between the video interworking gateway device and the calling user. First, capability exchange is performed between the video interworking gateway device and the calling user. For ensuring that the media format for opening a logical channel by the calling user is used widely and supported by general users, media capabilities contained in a terminal capability set sent from the video interworking gateway device should be commonly used in the 3G network, e.g., H.263 for video, and AMR for audio.

Next, a master-slave negotiation is performed between the video interworking gateway device and the calling user. The master-slave negotiation is optional to determine one of the two call parties as a master party and the other as a slave party, to avoid conflicts when some special operations are performed, e.g., the video logical channel is opened generally by the master party; however, if the two parties send an opening operation, a conflict may occur.

Then, the video interworking gateway device and the calling user send their multiplexing table to each other. The video interworking gateway device stores the multiplexing table of the calling user for subsequent parameter exchange. The sending of the multiplexing table to each other refers to that each H.324 entity informs the other side of the parameters of its H.223 multiplexing stream, including: a specific logical channel such as an audio logical channel and a video logical channel, and whether a channel nest is included, i.e., informing the other side of how to obtain data from respective logical channels by demultiplexing the H.223 multiplexing stream.

Finally, the video interworking gateway device and the calling user send an Open Logical Channel (OLC) message to each other, for the purpose of informing the other side that audio or video data is to be sent and the receiving of such data should be prepared. An Open Audio Logical Channel message is generally unidirectional and should be sent to each other. However, an Open Video Logical Channel message is bidirectional, which is opened by the calling user. On receiving the Open Audio Logical Channel and the Open Video Logical Channel messages from the calling user, the video interworking gateway device stores media capability parameters and multiplexing parameters of the two messages for subsequent parameter exchange.

Therefore, the negotiation between the calling user and the video interworking gateway device is accomplished. The video interworking gateway device connects the calling user to an IP resource device, which plays a video customized ring back tone subscribed to by the called user to the calling user. In the process the IP resource device plays the video customized ring back tone to the calling user, the video interworking gateway device utilizes a video interworking gateway resource to perform burdensome media stream coding and decoding operations. At the same time, the calling user awaits until the called user performs an off-hook.

S520 to S521: The called user performs an off-hook, and the video interworking gateway device in the MRBT sends a connection command to the called user on receiving an ANSWER message from the called user.

S522 to S525: The video interworking gateway device begins to negotiate with the called user about parameters after the called user performs the off-hook. Specifically, the process is as follows.

An H.245 negotiation begins between the video interworking gateway device and the called user. First, a capability exchange is performed. Media capabilities contained in a terminal capability set sent from the video interworking gateway device are capabilities used for receiving audio and video stream by the calling user after the video interworking gateway device negotiates with the calling user.

Next, a master-slave negotiation is performed between the video interworking gateway device and the called user.

Then, the video interworking gateway device and the called user send their multiplexing tables to each other. The multiplexing table of the called user, which is related to the VP call service, is stored for subsequent parameter exchange. The stored multiplexing table is released when the VP call service ends.

Finally, the video interworking gateway device receives audio and video Open Logical Channel messages sent from the called user.

S526 to S531: The video interworking gateway device exchanges the negotiation parameters of the calling user and those of the called user, and disconnects the connection between the calling user and the broadband resource device.

First, the video interworking gateway device exchanges the stored multiplexing tables of the calling user and the called user between the calling user and the called user.

Then, the video interworking gateway device sends a Request Channel Close (RCC) message to the calling user, to request the calling user to close the video logical channel opened by the calling user. The video interworking gateway device sends a Close Logical Channel (CLC) message to the calling user, to inform the calling user that the audio logical channel opened by the calling user has been closed. In this case, the video interworking gateway device has disconnected the connection between the calling user and the broadband resource device and has released the broadband resource.

Finally, the video interworking gateway device sends an Open Audio Logical Channel message to the called user. Parameters carried in the Open Audio Logical Channel message are the same as those carried in the stored Open Audio Logical Channel message from the calling user. The video interworking gateway device sends an Open Video Logical Channel message to the called user. Parameters carried in the Open Video Logical Channel message are completely the same as those carried in the stored Open Video Logical Channel message from the calling user. The video interworking gateway device sends an Open Audio Logical Channel message to the calling user. Parameters carried in the Open Audio Logical Channel message are the same as those carried in the stored Open Audio Logical Channel message from the called user. In this case, the video interworking gateway device has accomplished parameter exchange between the calling user and the called user, and thereby the method realizes a second negotiation between the calling user and the called user.

S532: A circuit switch device switches the call object of the calling user, i.e., connects a narrow-band circuit between the calling user and the called user by changing a narrow-band circuit bearer, so that the VP call service is implemented between the calling user and the called user directly via the narrow-band circuit.

Embodiment 2

An online monitor service is another specific embodiment of a VP call service requiring a broadband resource device to perform a video play in the CS domain of a 3G network. A specific application platform of the online monitor service is an online monitor service platform (IMR), which includes: a circuit switch device and a broadband resource device used for performing the video play and collecting digit in video mode. A 3G terminal used by a calling user which requires the online monitor service is an H.324 entity. The calling user himself installs a monitoring terminal at a place which needs to be monitored. The monitoring terminal is substantively the same as a general 3G terminal, with only simple modification such as automatic connection, waterproof and reinforcement. Each monitoring terminal has a call controlled number. The monitoring terminal is also an H.324 terminal.

A flow for implementing the online monitor service is as follows: a calling user first calls a specific service code when using the online monitor service, to connect to the IMR which authenticates the calling user by a video play and collecting digit in video mode and obtains a monitoring terminal number of the monitored place designated by the calling user; on obtaining the monitoring terminal number, the IMR connects the calling user to the monitoring terminal so that the calling user may watch the video image of the monitored place. Apparently, this service scenario involves the VP call service which requires the broadband resource device to perform a video play according to the embodiments of the present invention. The broadband resource device in the IMR performs the video play and collecting digit in video mode to the calling user, i.e., the VP call service is implemented between the calling user and the broadband resource device; after obtaining the monitoring terminal number of the designated monitored place, the calling user may watch the video image of the designated monitored place, i.e., the call object of the calling user should be switched from the broadband resource device to the monitoring terminal, so that the VP call service is implemented between the calling user and the monitoring terminal.

For implementing the online monitor service normally, a video interworking gateway device according to an embodiment of the present invention is integrated in the IMR system. The calling user calls the specific service code to connect to the IMR. The video interworking gateway device in the IMR negotiates with the calling user about parameters. On a successful negotiation, the video interworking gateway device connects the calling user to the broadband resource device, which performs the video play and collecting digit in video mode to the calling user and obtains the monitoring terminal number. The IMR originates a call to the monitoring terminal according to the monitoring terminal number. After the monitoring terminal performs an off-hook, the video interworking gateway device first negotiates with the monitoring terminal about parameters, then exchanges negotiation parameters of the calling user and those of the monitoring terminal, and disconnects the connection between the calling user and the broadband resource device. The circuit switch device connects the narrow-band circuit bearer between the calling user and the monitoring terminal.

Figure 6:
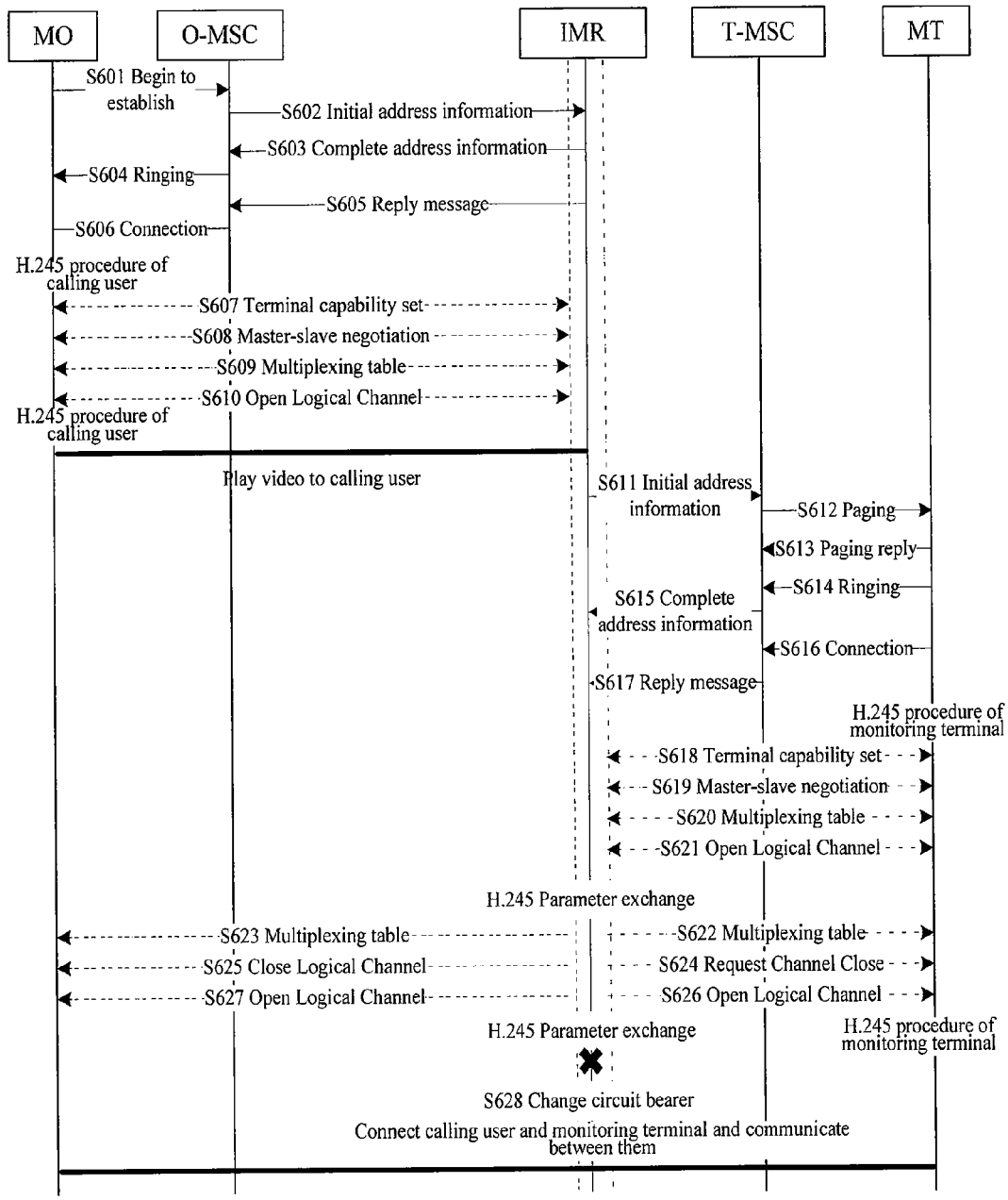
FIG. 6 is a flowchart of an online monitor service according to an embodiment of the present invention.

A flow for implementing the online monitor service is described in FIG. 6, which may include the steps as follows.

S601 to S604: A calling user which will activate an online monitor service dials a specific service code to originate a VP call to a video interworking gateway device in an IMR.

S603 to S604: The IMR returns a ringing to the calling user on receiving the VP call.

S605 to S606: The IMR sends a connection command to the calling user and instructs to complete the VP call.

S607 to S610: The video interworking gateway device negotiates with the calling user about parameters. Specifically, the process is as follows.

An H.245 negotiation begins between the video interworking gateway device and the calling user, and firstly capability exchange is performed.

Next, a master-slave negotiation is performed between the video interworking gateway device and the calling user.

Then, the video interworking gateway device and the calling user send their multiplexing tables to each other. The video interworking gateway device stores the multiplexing table of the calling user for subsequent parameter exchange.

Finally, the video interworking gateway device and the calling user send an Open Logical Channel message to each other. An Open Audio Logical Channel message is generally unidirectional and should be sent to each other. However, an Open Video Logical Channel message is bidirectional, which is opened by the calling user. On receiving the Open Audio Logical Channel message and the Open Video Logical Channel message from the calling user, the video interworking gateway device stores media capability parameters and multiplexing parameters of the two messages for subsequent parameter exchange.

Therefore, the calling user has negotiated with the video interworking gateway device successfully. The video interworking gateway device connects the calling user to the broadband resource device in the IMR. In the process of connection, a video interworking gateway resource is allocated for coding and decoding operations, so that the broadband resource device accomplishes performing the video and voice play to the calling user, prompts the calling user to enter an account number and a password for authentication, prompts the calling user to enter a monitored place after the authentication is passed, etc., and obtains a monitoring terminal number on a successful collecting digit in video mode. The video interworking gateway device in the IMR will originate a VP call to the monitoring terminal.

S611 to S613: The video interworking gateway device in the IMR originates a VP call to the monitoring terminal.

S614 to S615: The monitoring terminal returns a ringing to the IMR.

S616 to S617: The monitoring terminal answers automatically, returns a message CONNECT to the IMR to instruct the IMR to complete the VP call.

S618 to S621: The video interworking gateway device begins to negotiate with the monitoring terminal about parameters after the monitoring terminal answers automatically. Specifically, the process is as follows.

An H.245 negotiation begins between the video interworking gateway device and the monitoring terminal, and first capability exchange is performed, i.e., media capabilities carried in a terminal capability set sent from the video interworking gateway device are capabilities for receiving audio and video stream by the calling user after the negotiation with the calling user.

Next, a master-slave negotiation is performed between the video interworking gateway device and the monitoring terminal.

Then, the video interworking gateway device and the monitoring terminal send their multiplexing tables to each other. The video interworking gateway device stores the multiplexing table of the monitoring terminal for subsequent parameter exchange.

Finally, the video interworking gateway device receives audio and video Open Logical Channel messages sent from the monitoring terminal.

S622 to S627: The video interworking gateway device exchanges negotiation parameters of the calling user and the monitoring terminal, and disconnects the connection between the calling user and the broadband resource device.

First, the video interworking gateway device begins to exchange the parameters, i.e., exchanges the stored multiplexing tables of the calling user and those of the monitoring terminal between the calling user and the monitoring terminal.

Then, the video interworking gateway device sends a Request Channel Close (RCC) message to the calling user to request the calling user to close the video logical channel opened by the calling user. The video interworking gateway device sends a Close Logical Channel (CLC) message to the calling user to inform the calling user that the audio logical channel opened by the calling user has been closed. In this case, the video interworking gateway device has disconnected the connection between the calling user and the broadband resource device and has released the broadband resource.

Finally, the video interworking gateway device sends an Open Audio Logical Channel message to the monitoring terminal. Parameters carried in the Open Audio Logical Channel message are completely the same as those carried in the stored Open Audio Logical Channel message from the calling user. The video interworking gateway device sends an Open Video Logical Channel message to the monitoring terminal. Parameters carried in the Open Video Logical Channel message are completely the same as those carried in the stored Open Video Logical Channel message from the calling user. The video interworking gateway device sends an Open Audio Logical Channel message to the calling user. Parameters carried in the Open Audio Logical Channel message are completely the same as those carried in the stored Open Audio Logical Channel message from the monitoring terminal. In this case, the video interworking gateway has accomplished the parameter exchange between the calling user and the monitoring terminal and has accomplished the second negotiation between the calling user and the monitoring terminal.

S628: The circuit switch device switches the call object of the calling user, completes a narrow-band circuit between the calling user and the monitoring terminal by changing the circuit bearer, so that the calling user and the monitoring terminal may implement the VP call service directly via the narrow-band circuit.

The present invention is adapted for various 3G network involving H.324 entities. The 3G network includes but not limited to existing WCDMA, TD-SCDMA and CDMA2000 networks.

With the description of the embodiments, those skilled in the art may clearly understand that the present invention may be implemented by means of software and necessary general hardware or alternatively hardware. However, in most cases, the former is a better embodiment. Based on this understanding, the technical solution of the present invention substantively or a part contributing to the prior art may be in a form of software. Such computer software may be stored in readable storage media, e.g. ROM/RAM, diskette and optical disk, which include a plurality of instructions so that a computer device (may be a personal computer, a server, or a network device) may execute the methods of the embodiments of the present invention or part of the embodiments.

Apparently, those skilled in the art may make various modifications and variations to the present invention within the scope of the present invention. Therefore, it is intended that all such modifications and variations shall fall within the scope of the present invention and its equivalents.

What is claimed is:

1. A video interworking gateway device, comprising:
   a broadband resource connection unit, adapted to: connect a calling H.324 entity and a broadband resource device, wherein the calling H.324 entity requires the broadband resource device to perform a video play in a video phone call service; and disconnect the connection between the calling H.324 entity and the broadband resource device and instruct a bearer connection device to connect a bearer between the calling H.324 entity and the called H.324 entity;
   a parameter negotiation unit, adapted to negotiate with the calling H.324 entity about parameters to obtain negotiation parameters of the calling H.324 entity, inform the broadband resource connection unit to connect the calling H.324 entity to the broadband resource device on a successful negotiation, and negotiate with a called H.324 entity in the video phone call service about parameters to obtain negotiation parameters of the called H.324 entity;

a parameter storage unit, adapted to store the negotiation parameters of the calling H.324 entity and the negotiation parameters of the called H.324 entity, wherein the negotiation parameters of the calling H.324 entity and those of the called H.324 entity are obtained by the parameter negotiation unit; and a parameter exchange unit, adapted to exchange the negotiation parameters of the calling H.324 entity and the negotiation parameters of the called H.324 entity between the calling H.324 entity and the called H.324 entity, wherein the negotiation parameters of the calling H.324 entity and those of the called H.324 entity are stored in the parameter storage unit.

2. The video interworking gateway device according to claim 1, further comprising:

a parameter comparison unit, adapted to compare the negotiation parameters of the calling H.324 entity with the negotiation parameters of the called H.324 entity, which are stored in the parameter storage unit, and trigger the parameter exchange unit for exchanging negotiation parameters if determining the negotiation parameters of the calling H.324 entity are not the same as the negotiation parameters of the called H.324 entity.

3. A system for implementing a video phone call service, comprising a video interworking gateway device, a broadband resource device and a bearer connection device; wherein the video interworking gateway device is adapted to negotiate with a calling H.324 entity about parameters to obtain negotiation parameters of the calling H.324 entity, and connect the calling H.324 entity to the broadband resource device on a successful negotiation, wherein the calling entity requires the broadband resource device to perform a video play in a video phone call service;

the video interworking gateway device is further adapted to negotiate with a called H.324 entity in the video phone call service about parameters to obtain negotiation parameters of the called H.324 entity, exchange the negotiation parameters of the calling H.324 entity and the negotiation parameters of the called H.324 entity between the calling H.324 entity and the called H.324 entity, and disconnect the connection between the calling H.324 entity and the broadband resource device;

the broadband resource device is adapted to perform the video play; and the bearer connection device is adapted to connect a bearer between the calling H.324 entity and the called H.324 entity when the video interworking gateway device disconnects the connection between the calling H.324 entity and the broadband resource device.

4. The system according to claim 3, wherein the video interworking gateway device exchange the negotiation parameters of the calling H.324 entity and the negotiation parameters of the called H.324 entity between the calling H.324 entity and the called H.324 entity, in the case that the video interworking gateway device determines that the negotiation parameters of the calling H.324 entity and the negotiation parameters of the called H.324 entity are different from each other.

5. The system according to claim 3, wherein the bearer connection device comprises a circuit switch device.

6. The system according to claim 3, wherein the called H.324 entity comprises a Third Generation terminal having video capability and a network device supporting H.324 interworking.

7. A method for implementing a video phone call service, comprising:

negotiating with a calling H.324 entity, about parameters to obtain negotiation parameters of the calling H.324 entity, and connecting the calling H.324 entity to a broadband resource device on a successful negotiation, wherein the calling entity requires the broadband resource device to perform a video play in the video phone call service;

negotiating with a called H.324 entity in the video phone call service about parameters when the called user answers, and obtaining negotiation parameters of the called H.324 entity; and exchanging the negotiation parameters of the calling H.324 entity and the negotiation parameters of the called H.324 entity between the calling H.324 entity and the called H.324 entity, disconnecting the connection between the calling H.324 entity and the broadband resource device, and connecting a bearer between the calling H.324 entity and the called H.324 entity.

8. The method according to claim 7, wherein before the exchanging the negotiation parameters of the calling H.324 entity and the negotiation parameters of the called H.324 entity between the calling H.324 entity and the called H.324 entity, the method further comprises: determining that the negotiation parameters of the calling H.324 entity and the negotiation parameters of the called H.324 entity are different from each other.

9. The method according to claim 7, wherein the negotiation parameters comprise audio and video media capability parameters of the H.324 entities, and H.223 multiplexing parameters.

10. The method according to claim 7, wherein the video phone call service which requires the broadband resource device to perform the video play comprises a video customized ring back tone service and an online monitor service.

11. A non-transitory computer program product, comprising computer program code, which, when executed by a computer unit, causes the computer unit to perform the processes of claim 7.

12. A non-transitory computer program product, comprising computer program code, which, when executed by a computer unit, causes the computer unit to perform the processes of claim 8.

13. A non-transitory computer program product, comprising computer program code, which, when executed by a computer unit, causes the computer unit to perform the processes of claim 9.

14. A non-transitory computer program product, comprising computer program code, which, when executed by a computer unit, causes the computer unit to perform the processes of claim 10.

* * * * *